US007565690B2

(12) United States Patent
Doherty et al.

(10) Patent No.: US 7,565,690 B2
(45) Date of Patent: Jul. 21, 2009

(54) INTRUSION DETECTION

(75) Inventors: James M. Doherty, Georgetown, TX (US); Thomas Lee Adams, Austin, TX (US); Stephen Mark Mueller, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1003 days.

(21) Appl. No.: 10/605,689

(22) Filed: Oct. 17, 2003

(65) Prior Publication Data

US 2005/0033984 A1 Feb. 10, 2005

Related U.S. Application Data

(63) Continuation-in-part of application No. 10/634,117, filed on Aug. 4, 2003.

(51) Int. Cl.
G06F 7/04 (2006.01)
H04L 9/00 (2006.01)
(52) U.S. Cl. ......................................... 726/22; 713/150
(58) Field of Classification Search .................. 713/170, 713/150; 726/22
See application file for complete search history.

(56) References Cited

U.S. PATENT DOCUMENTS

| 5,919,257 | A  | * | 7/1999  | Trostle ........................... 726/22 |
| 5,923,884 | A  |   | 7/1999  | Peyret et al. |
| 6,081,894 | A  | * | 6/2000  | Mann ........................... 713/188 |
| 6,321,338 | B1 | * | 11/2001 | Porras et al. .................... 726/25 |
| 6,584,565 | B1 | * | 6/2003  | Zamek ........................ 713/156 |
| 6,647,400 | B1 | * | 11/2003 | Moran ......................... 707/205 |
| 6,654,882 | B1 | * | 11/2003 | Froutan et al. .............. 713/153 |
| 6,725,377 | B1 | * | 4/2004  | Kouznetsov ................. 726/23 |
| 6,735,702 | B1 | * | 5/2004  | Yavatkar et al. ............... 726/13 |
| 6,775,657 | B1 | * | 8/2004  | Baker .......................... 706/45 |
| 6,961,763 | B1 | * | 11/2005 | Wang et al. .................. 709/223 |
| 7,058,968 | B2 | * | 6/2006  | Rowland et al. ............... 726/1 |
| 7,117,504 | B2 | * | 10/2006 | Smith et al. .................. 719/328 |
| 7,124,438 | B2 | * | 10/2006 | Judge et al. .................... 726/22 |
| 7,133,729 | B1 | * | 11/2006 | Wang et al. .................... 700/83 |
| 7,140,041 | B2 | * | 11/2006 | Jeffries et al. ................. 726/24 |
| 7,155,745 | B1 | * | 12/2006 | Shin et al. ..................... 726/27 |
| 7,194,623 | B1 | * | 3/2007  | Proudler et al. ............. 713/164 |

(Continued)

FOREIGN PATENT DOCUMENTS

WO    WO 99/29066 A1    6/1999

OTHER PUBLICATIONS

Schneier, B. Applied Cryptography, Second Edition: Protocols, Algorithms, and Source Code in C, 1996. pp. 38-39, 429-431, 435-441.

*Primary Examiner*—Matthew B Smithers
*Assistant Examiner*—Techane J Gergiso
(74) *Attorney, Agent, or Firm*—Toler Law Group

(57) ABSTRACT

A system daemon starts through normal system startup procedures and reads its configuration file to determine which data entities (e.g., directories and files) are to be monitored. The monitoring includes a valid MD5 signature, correct permissions, ownership of the file, and an existence of the file. If any modification are made to the data entities, then the system daemon generates an alarm (intended for the administrator of the host) that an intrusion has taken place. Once an intrusion is detected, then the isolating steps or commands are issued in a real-time continuous manner to protect the host system from attack or intrusion.

23 Claims, 2 Drawing Sheets

U.S. PATENT DOCUMENTS

| | | | |
|---|---|---|---|
| 7,213,260 B2* | 5/2007 | Judge | 726/3 |
| 2002/0032798 A1* | 3/2002 | Xu | 709/238 |
| 2002/0069369 A1* | 6/2002 | Tremain | 713/201 |
| 2002/0078382 A1* | 6/2002 | Sheikh et al. | 713/201 |
| 2002/0112185 A1* | 8/2002 | Hodges | 713/201 |
| 2002/0129264 A1* | 9/2002 | Rowland et al. | 713/200 |
| 2002/0144140 A1 | 10/2002 | Ellison et al. | |
| 2002/0162026 A1* | 10/2002 | Neuman et al. | 713/201 |
| 2003/0051026 A1* | 3/2003 | Carter et al. | 709/224 |
| 2003/0097431 A1* | 5/2003 | Dill | 709/221 |
| 2003/0101358 A1* | 5/2003 | Porras et al. | 713/201 |
| 2003/0120935 A1* | 6/2003 | Teal et al. | 713/188 |
| 2003/0154399 A1* | 8/2003 | Zuk et al. | 713/201 |
| 2003/0159070 A1* | 8/2003 | Mayer et al. | 713/201 |
| 2003/0163704 A1* | 8/2003 | Dick et al. | 713/178 |
| 2003/0182580 A1* | 9/2003 | Lee | 713/201 |
| 2003/0204728 A1* | 10/2003 | Irwin | 713/176 |
| 2003/0217289 A1* | 11/2003 | Ammon et al. | 713/201 |
| 2004/0025015 A1* | 2/2004 | Satterlee et al. | 713/164 |
| 2004/0049693 A1* | 3/2004 | Douglas | 713/200 |
| 2004/0078568 A1* | 4/2004 | Pham et al. | 713/165 |
| 2005/0039047 A1* | 2/2005 | Raikar et al. | 713/201 |
| 2005/0262343 A1* | 11/2005 | Jorgensen et al. | 713/168 |

* cited by examiner

INTRUSION DETECTION

CROSS REFERENCE TO RELATED APPLICATIONS

The present application is a continuation-in-part of "HOST INTRUSION DETECTION AND ISOLATION", U.S. patent application Ser. No. 10/634,117, filed Aug. 24, 2003, whose contents are hereby incorporated by reference herein.

BACKGROUND OF THE INVENTION

1. Field of Invention

The present invention relates generally to the field of computer and network security. More specifically, the present invention is related to intrusion detection and isolation.

2. Discussion of Prior Art

Prior art solutions proposed to prevent intrusion in a host system fall under two main categories: external protection or internal protection. External protection scenarios include (but are not limited to) firewalls and routers which provide protection against various attacks (e.g., denial of service or DoS attacks) on a network infrastructure. The firewall approach prevents unauthorized access from an outsider (such as, an unauthorized user or hacker) by monitoring traffic on critical incoming ports. The firewall security layer is a control layer inserted between a local private network and an outside internet network. The firewall security layer permits only some traffic to pass through. The firewall is configured by a host master of the local private network based on the local private network's security policy. For example, the firewall can be configured to block: (a) traffic of a certain type, (b) traffic from certain addresses, or (c) traffic from all but a predetermined set of IP addresses. Firewalls also provide several schemes such as port forwarding and DMZ type applications. Additionally, they can, but often do not, limit outgoing port connections. The firewall, moreover, cannot block all IP addresses. An attacker (outsider, unauthorized user or hacker) is able to exploit this vulnerability. In this scenario, the attacker masks any harmful intent at the beginning of a session, gains access to sensitive data, and at a later point, attacks the host system. The firewall security layer has to update the harmful addresses after such attack or intrusion occurred. Thus, the firewall solution fails to offer a real-time blocking solution with regard to such harmful IP addresses.

Internal protection schemes have been designed to prevent breaches in security through the use of file permission, directory access, and execution permission usually set as part of the file system associated with the host. This prevents unauthorized users from accessing sensitive aspects of the system.

The question of how to determine, programmatically, that a system has been breached is a interesting problem. There have been several efforts in the industry that only partial solutions to address this issue.

Whatever the precise merits, features, and advantages of the above mentioned prior art internal or external protection schemes, none of them achieves or fulfills the purposes of the present invention.

SUMMARY OF THE INVENTION

The present invention provides for a method to detect intrusion in a host via a monitoring daemon operating in conjunction with a configuration file defining data entities (e.g., system files, configuration files, directories, etc) to be monitored. The method as implemented in the host comprises the steps of: (a) monitoring data entities via comparing a locally stored copy of a digital signature (e.g., an MD5 signature) associated with each data entity against a corresponding digital signature stored in a first remote database (e.g., an MD5 database); and (b) upon identifying a mismatch in compared digital signatures, issuing an instruction to record an entry in a log file located in a second remote database (e.g., a SYSLOG database), said entry identifying a possible intrusion in said host. In one embodiment, the host communicates with the first (e.g., an MD5 database) and second (e.g., a SYSLOG database) remote databases via one or more network interfaces and, subsequent to the above-mentioned step (b), the method further comprises the step of issuing a command to bring down the network interfaces to isolate the host. In another embodiment, the method comprises the additional step of issuing a command to the operating system of the host to bring it to a single user state.

In an extended embodiment, the first remote database (e.g., an MD5 database) and the second remote database (e.g., a SYSLOG database) are located on a single server or, alternatively, on a plurality of servers belonging to a common local area network.

In another embodiment, communications between the host and first remote database (e.g., an MD5 database) and communications between the host and second remote database (e.g., an SYSLOG database) are encrypted (for example, via the secure shell protocol).

The present invention also provides for a system to detect intrusion comprising: (a) a host running a monitoring daemon working in conjunction with a configuration file (the configuration file identifies files and directories to be monitored in the host), wherein the host communicates with external networks via one or more network interfaces and the monitoring daemon dynamically monitors the files and directories identified by the configuration file by comparing a locally stored digital signature corresponding to each file or directory against a remotely stored corresponding digital signature; (b) a digital signature database located remotely from the host and storing the digital signatures associated with files and directories identified by the configuration file; and (c) a log database located remotely from the host and recording entries corresponding to mismatches between a digital signature stored in said host and a corresponding digital signature in the digital signature database.

DESCRIPTION OF THE PREFERRED EMBODIMENTS

Figure 1:
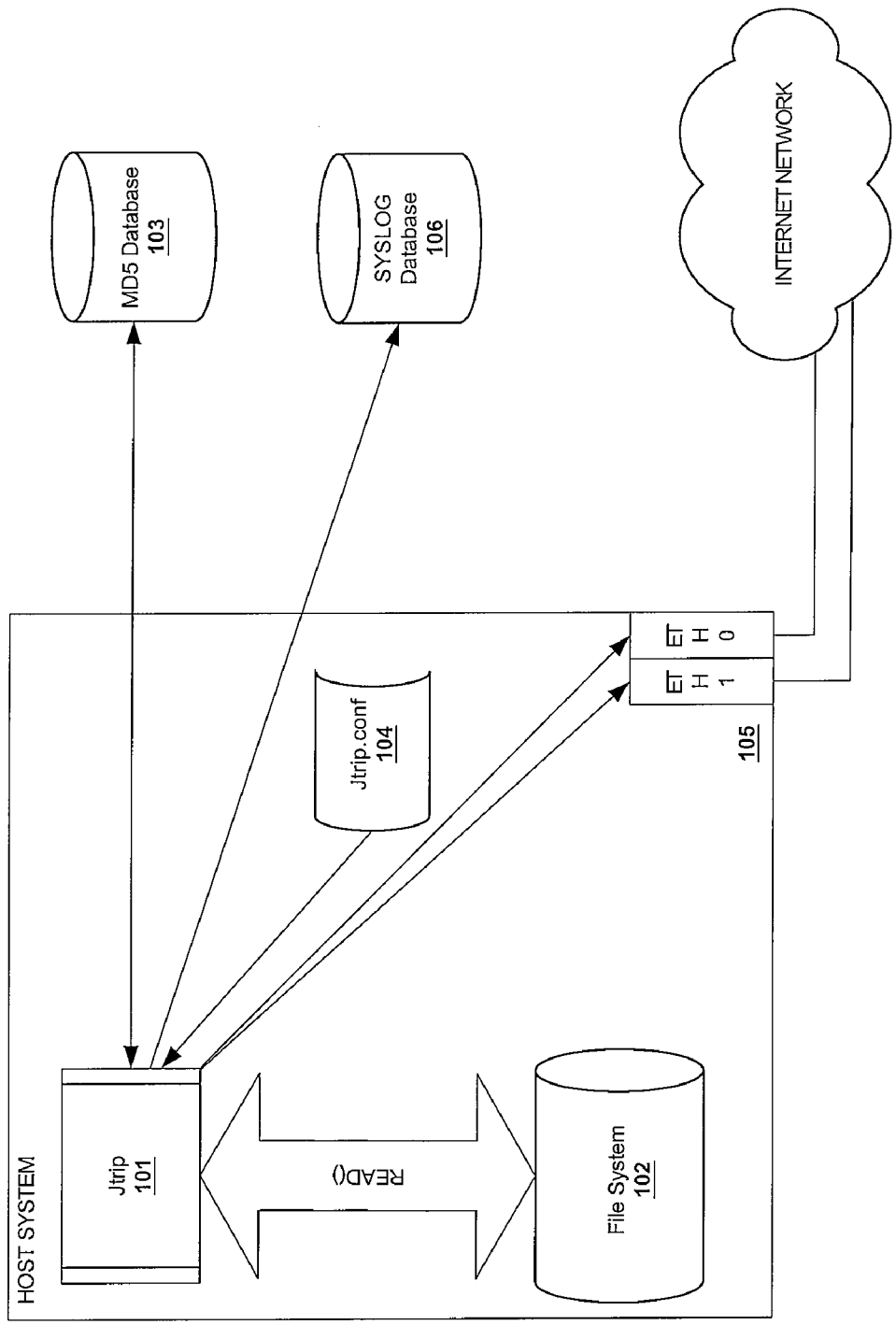
FIG. 1 illustrates an exemplary embodiment associated with the system of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates an exemplary embodiment associated with the system of the present invention. System daemon (designated as "jtrip" in FIG. 1) 101 is a daemon that is started through normal system startup procedures. It should be noted that the common UNIX® system is used as an example to illustrate the functionality of the present invention, but other systems can also be used in conjunction with the present invention. Hence, the type of operating system should not be used to limit the scope of the present invention. At start up, system daemon 101 reads (in real-time continuous manner) a configuration file (illustrated as "Jtrip.conf" in FIG. 1) 104 and determines which directories, normal system files, and configuration files of file system 102 are to be monitored in a real-time continuous manner. An example of a configuration file is provided below (it should be noted that lines marked with a "#" symbol in the configuration file correspond to comments and, hence, the system daemon 101 ignores such statements).

```
#----------------------------------------------------------
# Jtrip Configuration File for intrusion detection daemon
#----------------------------------------------------------
# Directives for script are as follows
# DIR=/bin This tells jtrip to use all members of /bin
# to include in the database
# FILE=/bin/rm This tells jtrip to use only this file
# when creating the database
# CONF=/etc/host this tells jtrip that this is a config
# file and may be checked on a different
# Schedule from other directives this is
# used to check vendor supplied control
# files
#----------------------------------------------------------
DIR=/bin
DIR=/sbin
DIR=/usr/sbin
DIR=/usr/local/sbin
FILE=/etc/hosts.equiv
CONF=/etc/pam.conf
------------------------------------------
```

The Jtrip.conf configuration file 104 tells Jtrip system daemon 101 which data entities (e.g., directories, files, etc.) of file system 102 are to be monitored in a real-time continuous manner. The data includes a valid digital signature such as a MD5 signature, correct permissions, ownership of the file, and information indicating if the file still exists. An MD5 signature is a cryptographic hash code in a MD5 database 103. The MD5 signature (a cryptographic hash code) is generated for each receiving file and compared to a previous signature for that file stored in the MD5 database 103. The system daemon 101 identifies any mismatch between a locally stored digital signature against the remotely stored (at the MD5 database 103) digital signature. The Jtrip 101 reads valid known MD5 signatures and permissions associated with data entities from the remote MD5 database 103. If any modification are detected based upon the comparison of the digital signatures, the Jtrip system daemon 101 alarms a root user that an intrusion has taken place. Hence, the Jtrip system daemon 101 can be used to monitor one or more files and/or one or more directories. It should be emphasized that the MD5 database 103 is located at a remote location, whereby it is isolated physically as well as programmatically from the monitored host system. A SYSLOGD database 106 is also provided at a remote location. It should be emphasized that, just as the MD5 database, the SYSLOGD database 106 is also located at a remote location, whereby it is isolated physically as well as programmatically from the monitored host system.

In one embodiment, the SYSLOGD database 106 is remote from both the MD5 database 103 and the host system. In an alternate embodiment, the SYSLOGD database and the MD5 database are located on a single server or a plurality of servers belonging to a common network (e.g., local area network).

Once an intrusion (from outsider, un-authorized user, or hacker) is detected (in real-time continuous manner), any of, or a combination of, the following steps are taken to protect the rest of the host system from the compromised system:

1. a log is written to the remote SYSLOGD database 106 indicating the occurrence of a possible intrusion;

2. an IFCONFIG down command is issued (from Jtrip 101) to one or more network interface 105 wherein the IFCONFIG down commands isolate the host system from the outside network; and 3. an INIT 1 command is issued (by the Jtrip 101) to the operating system for taking the host system down to single user state, whereby the INIT 1 command limits the access to a single user and the access is physical to the interface 105.

Figure 2:
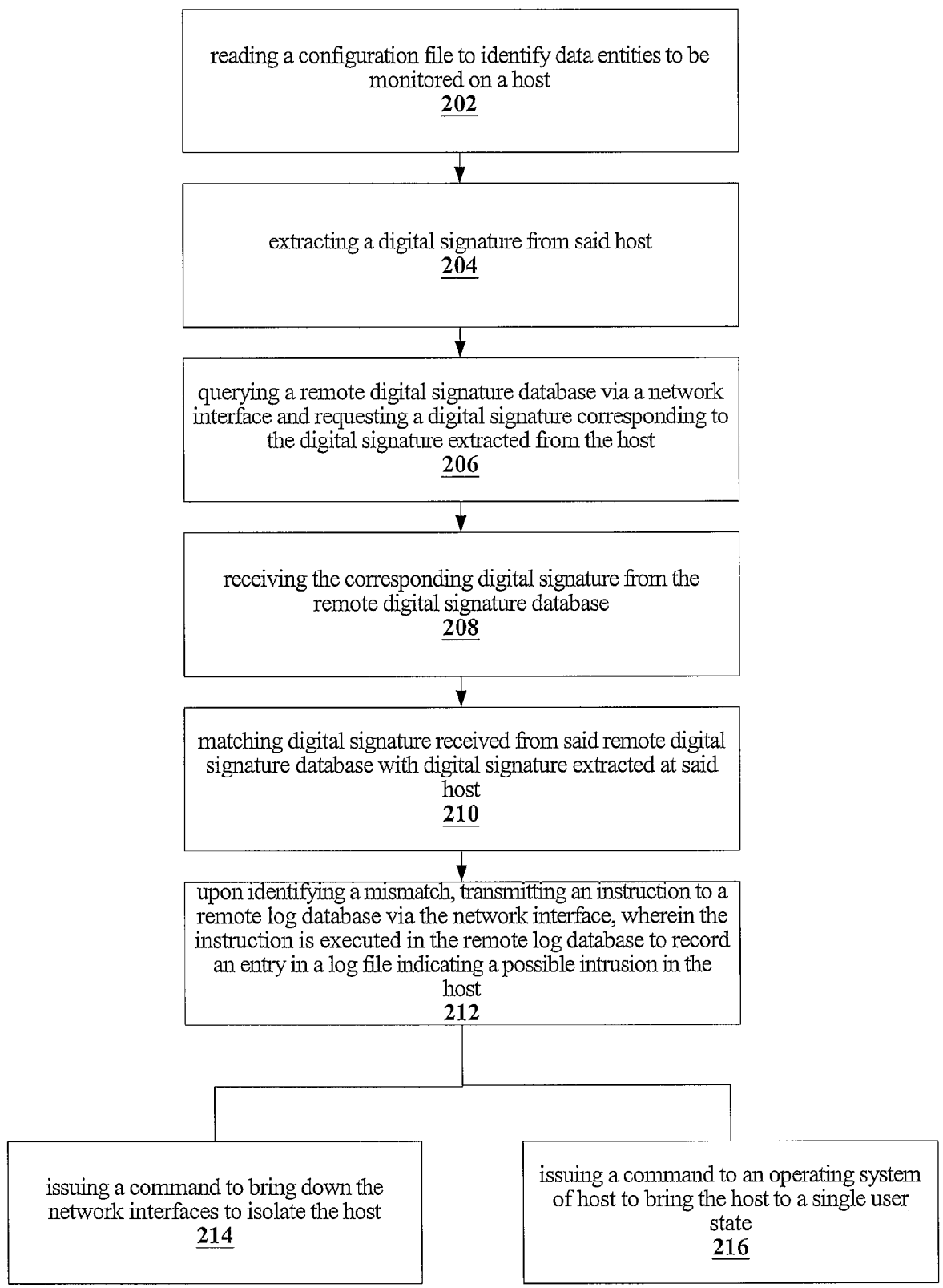
FIG. 2 illustrates a flow chart outlining one embodiment of the present invention's method for detecting an intrusion in a host system.

FIG. 2 illustrates a flow chart outlining one embodiment of the present invention's method for detecting an intrusion in a host system, wherein the host communicates with external networks via has one or more network interfaces. The method comprising the steps of: (a) reading a configuration file to identify data entities to be monitored on a host—step 202; (b) for each data entity to be monitored, extracting a digital signature from said host—step 204; (c) for each data entity to be monitored, querying a remote digital signature database via a network interface and requesting a digital signature corresponding to the digital signature extracted from the host—step 206; (d) for each data entity to be monitored, receiving the corresponding digital signature from the remote digital signature database—step 208; (e) matching digital signature received from said remote digital signature database with digital signature extracted at said host—step 210; (f) upon identifying a mismatch, transmitting an instruction to a remote log database via the network interface, wherein the instruction is executed in the remote log database to record an entry in a log file indicating a possible intrusion in the host—step 212; and (g) performing any one of, or a combination of, the following steps:

(i) issuing a command to bring down the network interfaces to isolate the host—step 214; or (ii) issuing a command to an operating system of host to bring the host to a single user state—step 216.

In another embodiment, communications between the host and SYSLOGD database and communications between the host and the MD5 database are encrypted (for example, via the secure shell protocol).

Furthermore, the present invention includes a computer program code based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Implemented in computer program code based products are software modules for: (a) monitoring data entities via comparing a locally stored copy of a digital signature (e.g., an MD5 signature) associated with each data entity against a corresponding digital signature stored in a first remote database (e.g., an MD5 database); (b) upon identifying a mismatch in compared digital signatures, issuing an instruction to record an entry in a log file located in a second remote database (e.g., a SYSLOG database), said entry identifying a possible intrusion in said host; (c) issuing a command to bring down one or more network interfaces to isolate the host; and (d) issuing a command to the operating system of the host to bring it to a single user state.

CONCLUSION

A system and method has been shown in the above embodiments for the effective implementation of a system and method implementing host intrusion detection and isolation. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by host operating system, particular database, type of encryption link between the host and the MD5 database, type of encryption link between the host and the SYSLOGD server, or specific hardware interface.

The above enhancements are implemented in various computing environments. For example, the present invention may be implemented on a conventional IBM PC or equivalent, multi-nodal system (e.g., LAN, WAN) or networking system (e.g., Internet, WWW, wireless web). All programming related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of network programming.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of detecting intrusion in a host via a monitoring daemon operating in conjunction with a configuration file defining data entities to be monitored, the method comprising:
    monitoring data entities by comparing a locally stored copy of a digital signature associated with each data entity against a corresponding digital signature stored in a first remote database; and
    upon identifying a mismatch in compared digital signatures, issuing an instruction to record an entry in a log file located in a second remote database, said entry identifying a possible intrusion in a host, and issuing a command to an operating system of said host to bring said host to a single user state, wherein the command limits access to a single user and the access is physical to an interface of the host.

2. The method of claim 1, further comprising issuing a command to bring down one or more network interfaces of said host to isolate said host upon identifying the mismatch in compared digital signatures.

3. The method of claim 1, wherein said first remote database and said second remote database are located on a single server or a plurality of servers belonging to a local area network.

4. The method of claim 1, wherein communications between said host and said first remote database are encrypted.

5. The method of claim 1, wherein communications between said host and said second remote database are encrypted.

6. The method of claim 1, wherein said digital signature is an MD5 signature and said first remote database is an MD5 database.

7. The method of claim 1, wherein said second remote database is a SYSLOG database.

8. The method of claim 1, wherein said data entities comprise one or more of files, configuration files, and directories.

9. A system to detect intrusion comprising:
    a host running a monitoring daemon working in conjunction with a configuration file, said configuration file identifying files and directories to be monitored in said host and said host communicating with external networks via one or more network interfaces, said monitoring daemon dynamically monitoring said files and directories identified by said configuration file by comparing a locally stored digital signature corresponding to each file or directory against a remotely stored corresponding digital signature;
    a digital signature database remote from said host storing said digital signatures associated with files and directories identified by said configuration file; and
    a log database remote from said host recording entries corresponding to mismatches between a digital signature stored in said host and a corresponding digital signature in said digital signature database,
    wherein a mismatch identifies a possible intrusion in the host, resulting in a command being issued to an operating system of said host to bring said host to a single user state, wherein the command limits access to a single user and the access is physical to an interface of the host.

10. The system of claim 9, wherein said digital signature database and said log database are located on a single server or a plurality of servers belonging to a local area network.

11. The system of claim 9, wherein communications between said host and said digital signature database are encrypted.

12. The system of claim 9, wherein communications between said host and said log database are encrypted.

13. The system of claim 9, wherein said digital signature is an MD5 signature and said first remote database is an MD5 database.

14. An article of manufacture comprising a computer usable medium having computer readable program code embedded therein to detect intrusion in a host via a monitoring daemon operating in conjunction with a configuration file defining data entities to be monitored, said medium comprising:
    computer readable program code comprising executable instructions to monitor data entities via comparing a locally stored copy of a digital signature associated with each data entity against a corresponding digital signature stored in a first remote database;
    computer readable program code comprising executable instructions to issue an instruction to record an entry in a log file located in a second remote database upon identifying a mismatch in compared digital signatures, said entry identifying a possible intrusion in a host; and computer readable program code comprising executable instructions to issue a command to an operating system of said host to bring said host to a single user state upon identifying the mismatch in compared digital signatures, wherein the command limits access to a single user and the access is physical to an interface of the host.

15. The article of manufacture of claim 14, further comprising computer readable program code comprising executable instructions to issue a command to bring down one or more network interfaces to isolate said host upon identifying the mismatch in compared digital signatures.

16. An intrusion detection and isolation method implemented using a monitoring daemon in a host, said host having one or more network interfaces to communicate over one or more networks, said method comprising:
   reading a configuration file to identify data entities to be monitored on a host;
   for each data entity to be monitored, extracting a digital signature from said host;
   for each data entity to be monitored, querying a remote digital signature database via said one or more network interfaces and requesting a digital signature corresponding to said digital signature extracted from said host;
   for each data entity to be monitored, receiving said corresponding digital signature from said remote digital signature database;
   matching digital signature received from said remote digital signature database with digital signature extracted at said host;
   upon identifying a mismatch, transmitting an instruction to a remote log database via said one or more network interfaces, said instruction executed in said remote log database to record an entry in a log file indicating a possible intrusion in said host; and
   issuing a command to an operating system of said host to bring said host to a single user state, wherein the command limits access to a single user and the access is physical to an interface of the host.

17. The intrusion detection and isolation method of claim 16, wherein said remote digital signature database and said remote log database are located on a single server or a plurality of servers belonging to a local area network.

18. The intrusion detection and isolation method of claim 16, wherein communications between said host and said remote digital signature database are encrypted.

19. The intrusion detection and isolation method of claim 16, wherein communications between said host and said remote log database are encrypted.

20. The intrusion detection and isolation method of claim 16, wherein said remote digital signature database is an MD5 database.

21. The intrusion detection and isolation method of claim 16, wherein said remote log database is a SYSLOG database.

22. The intrusion detection and isolation method of claim 16, wherein said data entities are any of the following: system files, configuration files, or directories.

23. The intrusion detection and isolation method of claim 16, further comprising issuing a command to bring down said one or more network interfaces to isolate said host.

* * * * *